(12) United States Patent
Visweswariah et al.

(10) Patent No.: US 8,510,696 B2
(45) Date of Patent: *Aug. 13, 2013

(54) ORDERING OF STATISTICAL CORRELATED QUANTITIES

(75) Inventors: Chandramouli Visweswariah, Croton-On-Hudson, NY (US); Jinjun Xiong, Ossining, NY (US); Vladimir P. Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,637

(22) Filed: Mar. 16, 2012

(65) Prior Publication Data

US 2012/0192136 A1  Jul. 26, 2012

Related U.S. Application Data

(63) Continuation of application No. 12/696,186, filed on Jan. 29, 2010, now Pat. No. 8,266,565.

(51) Int. Cl.
G06F 17/50 (2006.01)
(52) U.S. Cl.
USPC .......................... 716/113; 716/108; 716/134
(58) Field of Classification Search
USPC .......................................... 716/108, 113, 134
See application file for complete search history.

(56) References Cited

U.S. PATENT DOCUMENTS

| | | | |
|---|---|---|---|
| 7,086,023 B2 | 8/2006 | Visweswariah | |
| 7,437,697 B2 | 10/2008 | Venkateswaran et al. | |
| 7,581,201 B2 | 8/2009 | Kazda et al. | |
| 8,028,260 B1 | 9/2011 | Ravi et al. | |
| 2007/0204248 A1 | 8/2007 | Homma et al. | |
| 2009/0013294 A1 | 1/2009 | Visweswariah et al. | |
| 2009/0070237 A1 | 3/2009 | Lew et al. | |
| 2009/0100393 A1 | 4/2009 | Visweswariah et al. | |
| 2009/0119629 A1 | 5/2009 | Grise et al. | |
| 2009/0150844 A1 | 6/2009 | Iyengar et al. | |
| 2009/0199145 A1 | 8/2009 | Scheffer | |

OTHER PUBLICATIONS

U.S. Appl. No. 12/696,186, filed Jan. 29, 2010, Notice of Allowance dated May 4, 2012.
U.S. Patent Application No. 12/696,186, filed Jan. 29, 2010, Office Action dated Mar. 6, 2012.
Xiong, et al., Statistical Ordering of Correlated Timing Quantities and its Application for Path Ranking, DAC 2009, Jul. 26-31, 2009, San Francisco California.
Habitz, et al., IC Chip At-Function-Speed Testing With Process Coverage Evaluation, IBM Dossier BUR290060235, Dec. 21, 2006.
Xiong, et al., "Criticality Computation in Parameterized Statistical Timing", DAC 2006 Jul. 24-28, 2006, San Francisco, California.

*Primary Examiner* — Vuthe Siek
(74) *Attorney, Agent, or Firm* — Preston Young; Hoffman Warnick LLC

(57) ABSTRACT

Solutions for ordering of statistical correlated quantities are disclosed. In one aspect, a method includes timing a plurality of paths in an integrated circuit to determine a set of timing quantities associated with each of the plurality of paths; determining a most critical timing quantity in the set of timing quantities; forming a tiered timing quantity arrangement for ordering a plurality of timing quantities in the set of timing quantities; removing the most critical timing quantity from the set of timing quantities and placing the most critical timing quantity in an uppermost available tier of the tiered timing quantity arrangement; and repeating the determining, forming and removing for the set of timing quantities excluding the removed most critical timing quantity.

10 Claims, 10 Drawing Sheets

ORDERING OF STATISTICAL CORRELATED QUANTITIES

CROSS-REFERENCE TO RELATED APPLICATION

This Application is a continuation of currently pending U.S. patent application Ser. No. 12/696,186, which was filed on Jan. 29, 2010 and is incorporated herein by reference.

BACKGROUND

The subject matter disclosed herein relates to ordering of statistical correlated quantities. Specifically, the subject matter disclosed herein relates to ordering of statistical correlated quantities for ranking electrically conductive paths in a semiconductor device.

As structural dimensions of integrated circuits have become ever-smaller, meeting design conditions across a plurality of these devices has become more difficult. In analyzing functions of these devices, designers often look to the timing quantities (e.g., slacks) of paths through a circuit to determine which paths are most likely to affect device performance. Particularly, designers attempt to find the paths through the circuit which have the highest probability of affecting performance, i.e., being "critical." Due to process variations across a plurality of devices, each timing quantity (i.e., slack) is a statistical distribution. That is, each timing quantity for a given path has a probability distribution indicating the path's likelihood of having such a timing performance across a plurality of devices.

BRIEF DESCRIPTION OF THE INVENTION

Solutions for ordering of statistical correlated quantities are disclosed. In one aspect, a method includes timing a plurality of paths in an integrated circuit to determine a set of timing quantities associated with each of the plurality of paths; determining a most critical timing quantity in the set of timing quantities; forming a tiered timing quantity arrangement for ordering a plurality of timing quantities in the set of timing quantities; removing the most critical timing quantity from the set of timing quantities and placing the most critical timing quantity in an uppermost available tier of the tiered timing quantity arrangement; and repeating the determining, forming and removing for the set of timing quantities excluding the removed most critical timing quantity.

A first aspect includes a method of determining an order of statistical correlated quantities in an integrated circuit, the method comprising: timing a plurality of paths in an integrated circuit to determine a set of timing quantities associated with each of the plurality of paths; determining a most critical timing quantity in the set of timing quantities; forming a tiered timing quantity arrangement for ordering a plurality of timing quantities in the set of timing quantities; removing the most critical timing quantity from the set of timing quantities and placing the most critical timing quantity in an uppermost available tier of the tiered timing quantity arrangement; and repeating the determining, forming and removing for the set of timing quantities excluding the removed most critical timing quantity.

A second aspect includes a computer system comprising: a set of computing devices configured to determine an order of statistical correlated quantities in an integrated circuit, by performing actions comprising: receiving timing quantity data derived from timing of an integrated circuit, the timing quantity data including a set of timing quantities associated with a plurality of paths in the integrated circuit; determining a most critical timing quantity in the set of timing quantities; forming a tiered timing quantity arrangement for ordering a plurality of timing quantities in the set of timing quantities; removing the most critical timing quantity from the set of timing quantities and placing the most critical timing quantity in an uppermost available tier of the tiered timing quantity arrangement; and repeating the determining, forming and removing for the set of timing quantities excluding the removed most critical timing quantity.

A third aspect includes a program product stored on a computer readable storage medium for determining an order of statistical correlated quantities in an integrated circuit, which when executed on at least one computing device, performs the following: receives timing quantity data derived from timing of an integrated circuit, the timing quantity data including a set of timing quantities associated with a plurality of paths in the integrated circuit; determines a most critical timing quantity in the set of timing quantities; forms a tiered timing quantity arrangement for ordering a plurality of timing quantities in the set of timing quantities; removes the most critical timing quantity from the set of timing quantities and places the most critical timing quantity in an uppermost available tier of the tiered timing quantity arrangement; and repeats the determining, forming and removing for the set of timing quantities excluding the removed most critical timing quantity.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention provide solutions for ordering of statistical correlated quantities. Aspects of the invention provide a method, a system, and a program product for ordering of statistical correlated quantities. While these embodiments may be described in conjunction with one another, each embodiment described herein may also be used in conjunction with other methods, systems and/or structures not explicitly described.

One use of a static timing analysis in integrated circuits (ICs) is to provide feedback and diagnostics to aid designers in optimizing timing and fixing timing failures. One form of useful feedback is an ordering of timing quantities such as "slacks" across portions of a circuit. As used herein, the term "slack" may refer to the difference between a timing requirement (e.g., design requirement) and an actual timing of a portion of a circuit. Slacks may be measured on physical integrated circuits, including portions such as edges, nodes, paths, etc. In comparing different timing quantities (e.g., slack), it is important not only to determine which edge, node, path, etc. slack is most critical (e.g., slowest), but it is also important to determine a rank order of slacks across a plurality of edges, nodes, paths, etc. Due to increased process variability, each node, edge, path, etc. has a probability of being the most critical among a plurality of manufactured ICs. This probability is defined as a "criticality probability." While criticality probabilities are helpful in identifying the most critical timing quantities across a plurality of ICs, these probabilities may suffer from "probability masking." The term "probability masking" is generally defined as a phenomenon whereby identification of a most critical timing quantity distribution may make ordering of second, third, fourth, etc. timing quantity distributions difficult. That is, due to the probability distributions of each timing quantity, it may be difficult to rank the timing quantities which are not the most critical in a given test.

Figure 1:
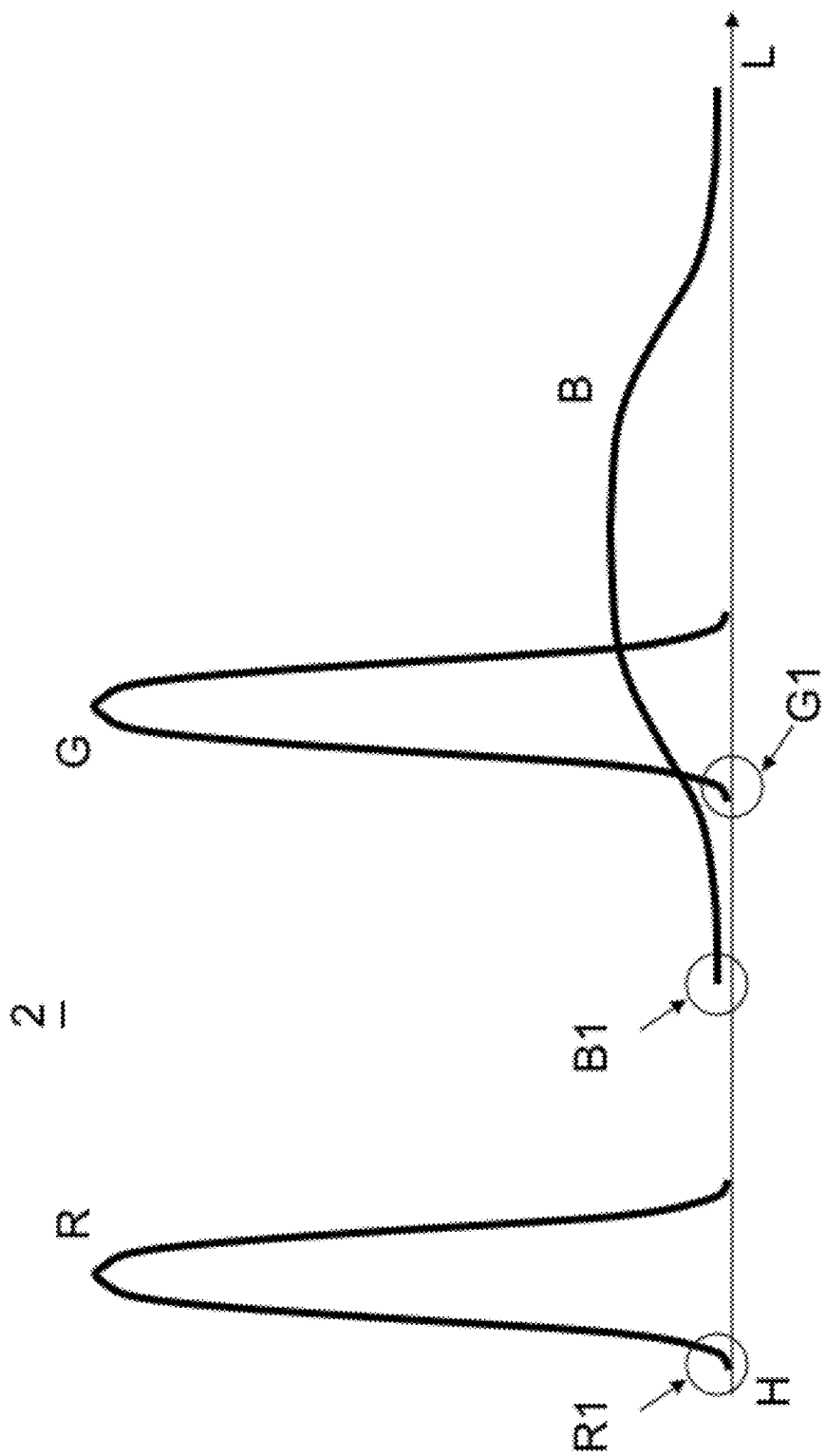
FIGS. 1-2 show illustrative examples of timing quantity distribution graphs.

For example, turning to FIG. 1, a graph 2 illustrating probability distributions of three timing quantities is shown. In this example, the three timing quantity distributions are labeled, "R", "G", and "B", respectively. These distributions (R, G, B) are plotted on a horizontal axis representing timing performance (i.e., slack), where "H" represents a worse (less desirable) timing performance than "L." In this example, using a criticality analysis (probability of being most critical), timing quantity R is the most critical. That is, timing quantity R has the highest probability of being the most critical (as compared with G and B). Using this criticality analysis, R has a criticality equal to one (1.0), while G and B each have criticalities equal to zero (0), because there is a zero probability that G or B will ever be more critical than R. However, viewing graph 2 it is evident that while G and B have equal probabilities of being most critical (zero), they do not have equal probabilities of being critical. That is, timing quantity R "masks" the differences between timing quantities G and B. This phenomenon is known as "dominance masking", and may cause difficulties in properly ordering a plurality of timing quantities.

Using a projection analysis based upon the timing quantity distributions (R, G, B) of FIG. 1 yields a different result than the criticality analysis, however, the result is still inaccurate. In a projection approach, for example, a 3-sigma projection may be used to determine which timing quantity is most critical. Using this analysis, the most critical timing quantity is that one with a projection point (outermost point on curve) closest to H. In this example, timing quantity R has a point (R1) on its distribution which is more critical (closer to H) than any point on the distribution of G (G1) or B (B1). Therefore, using this projection (e.g., 3-sigma projection) analysis, R is again the most critical timing quantity. However, ranking the timing quantity distributions of G and B, this optimization technique would place B as more critical than G (where B1 is closer to H than G1). This ranking order of R, then B, then G, again, is not accurate. It is evident from graph 2 that G has a greater probability of being more critical than B, and as such, the projection approach fails to properly order the plurality of timing quantities.

Figure 2:
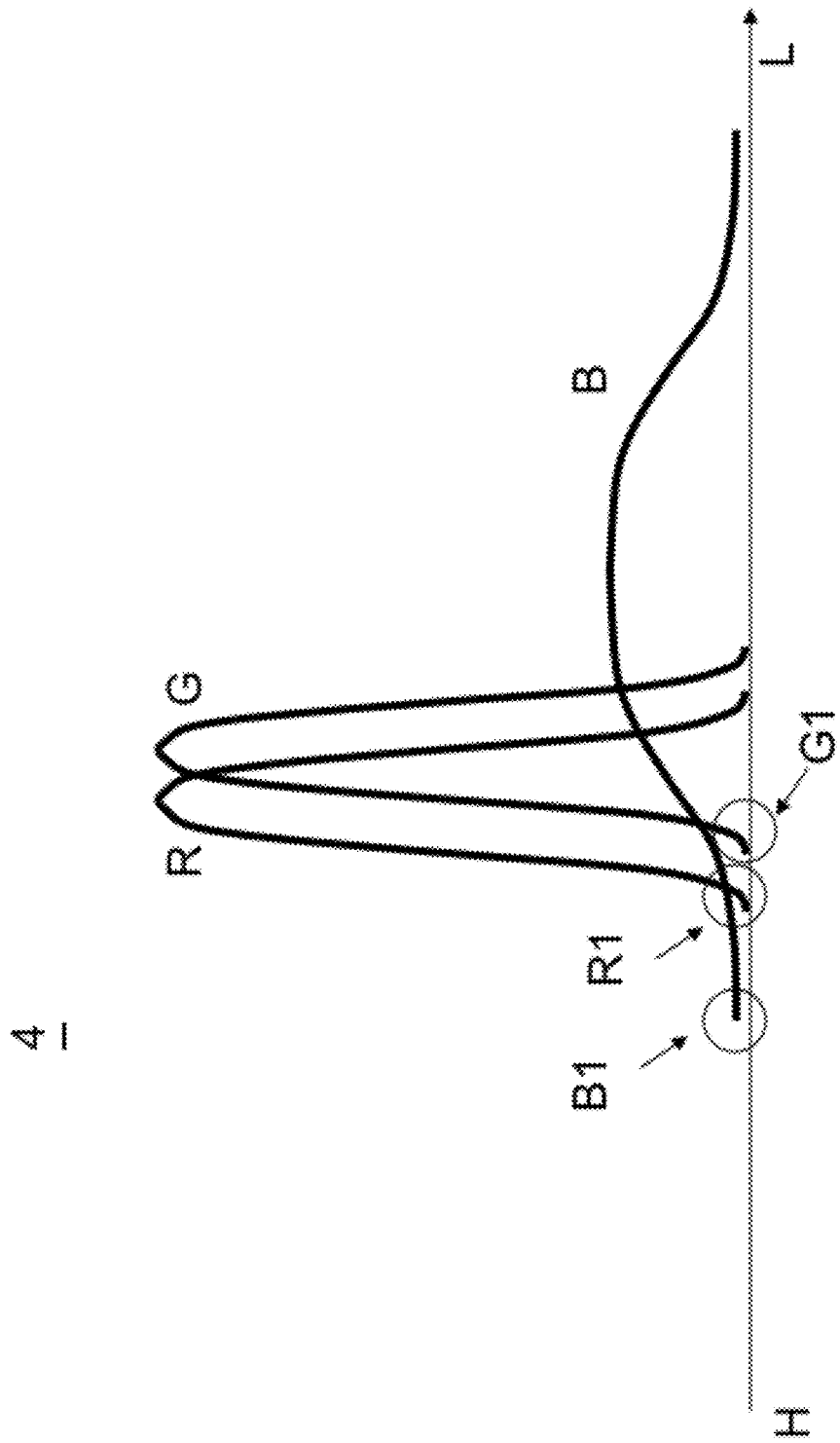

Turning to FIG. 2, another graph 4 illustrating the timing quantity distributions R, G, B under different conditions is shown. In this case, timing quantities R and G are almost perfectly correlated. That is, a movement along the distribution of timing quantity R corresponds almost perfectly to a movement along the distribution of timing quantity G. In this example, using the criticality analysis discussed above, there is a zero probability that G will ever be more critical (closer to H) than the corresponding distribution of R. Under this analysis, G will have a criticality of zero (0). However, using the same standard criticality analysis, there is a small probability that B will be more critical than both R and G. In this analysis, R has the highest probability of being critical (e.g., 0.8), but B still has a probability of being critical (e.g., 0.2). Therefore, a criticality ranking of the timing quantity distributions of graph 4 would read: R (e.g., 0.8), then B (e.g., 0.2), then G (0). However, when looking at graph 4 and removing the correlation effect of R, it is evident that G has a higher probability of being more critical than B (its distribution is closer to H). That is, R creates a "correlation mask" preventing a proper determination of the criticality of G, because G cannot be more critical than R (as they are almost perfectly correlated). This correlation masking effect prevents proper ranking of criticalities, which should read: R, then G, then B.

Using the projection (e.g., 3-sigma projection) analysis on graph 4 of FIG. 2 as described with respect to FIG. 1, a different result is achieved. However, this result still incorrectly ranks the criticalities of R, G and B. Viewing graph 4, and using a projection analysis, it is evident that B1 is closer to H than both R1 and G1. As such, using the projection approach, B would be ranked as most critical, followed by R, and then G. However, as is evident from viewing graph 4, R has a greater probability of being closer to H than G, and G has a greater probability of being closer to H than B. Therefore, the projection analysis cannot properly order the timing quantities shown in graph 4.

The examples shown and described with reference to FIGS. 1-2 are merely illustrative of the concepts of criticality and projection in ranking of timing quantities. It is understood that the embodiments described herein may describe a plurality of timing quantities, which may in no way resemble the distributions shown and described in FIGS. 1-2.

Figure 3:
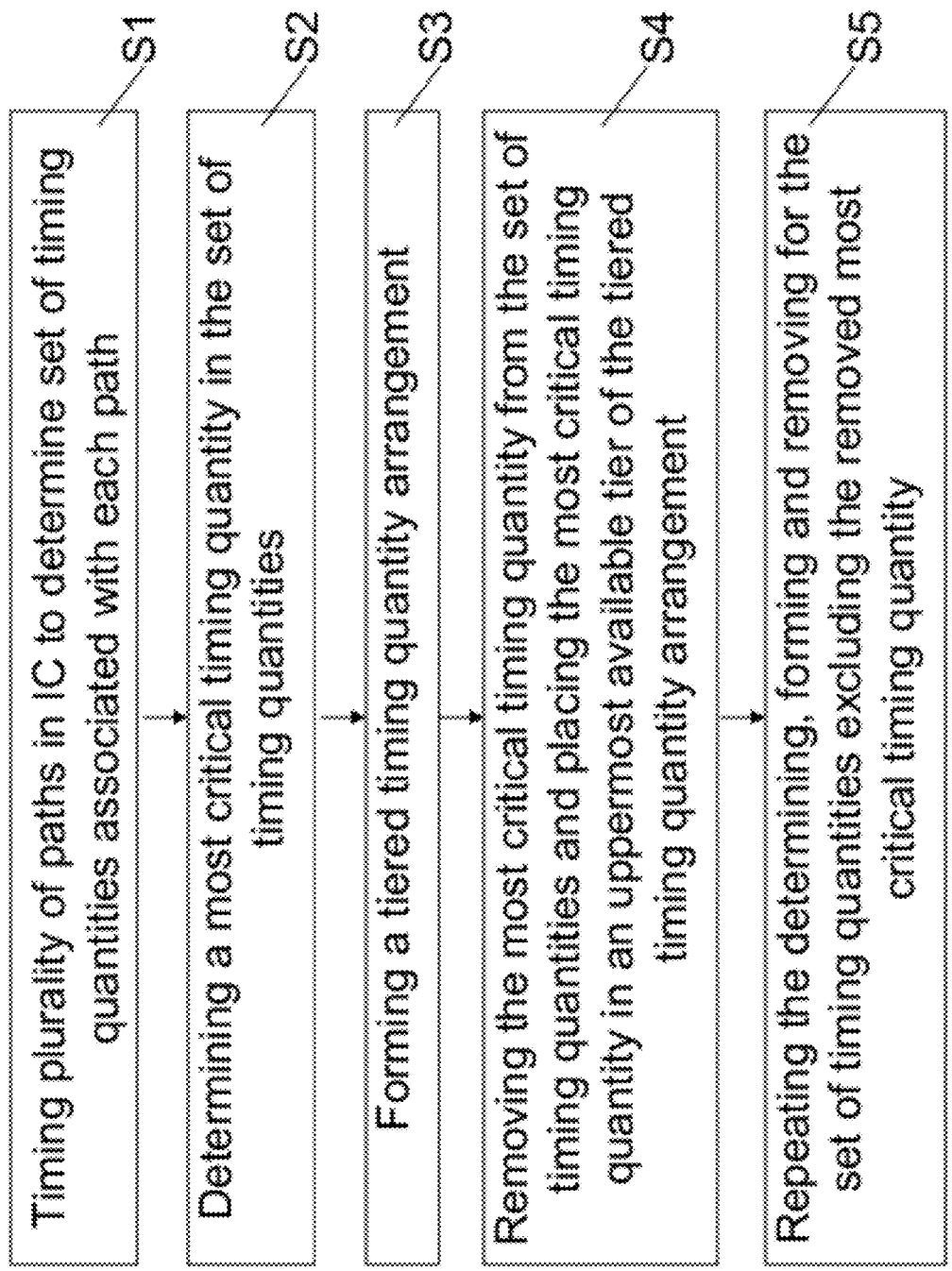
FIGS. 3-4 show flow charts illustrating a method according to embodiments.

Turning to FIG. 3, a method flow diagram illustrating steps in a method of ordering statistical correlated quantities in accordance with an embodiment is shown. Step S1 includes timing a plurality of paths in an integrated circuit (IC) to determine a set of timing quantities associated with each path. As described above, timing quantities may include slacks or delays in transmission of an electrical signal through an IC path. Each path timed may have a required design timing quantity, and an actual or timed timing quantity. The difference between the design and the actual or timed quantities may herein be referred to as a "slack", and if significant (e.g., negatively large enough), may indicate that one or more paths in the IC should be modified. Timing of the plurality of paths in an IC may be performed by a computerized system such as statistical timing analysis system. In any case, timing quantity data may be gathered, including a set of timing quantities associated with each of the plurality of paths in the IC.

S2 includes taking the timing quantity data (including the set of timing quantities) and determining a most critical timing quantity in the set of timing quantities. In one embodiment, the determining of the most critical timing quantity may be performed using a criticality analysis. As described with reference to FIGS. 1-2, a criticality analysis may include finding a timing quantity distribution with the highest probability of being most critical (e.g., timing quantity R in FIG. 1). For example, timing quantity distributions may be plotted graphically (e.g., as in FIG. 1), and a graphical analysis may be performed in any conventional manner on the timing quantity distributions to determine which is most critical (e.g., highest probability of being closest to H on the graph). In another embodiment, a statistical analysis may be performed without use of a graphical analysis. In any case, criticality may be used to determine a timing quantity distribution with the probability of being most critical.

S3 includes forming a tiered timing quantity arrangement for ordering a plurality of timing quantities in the set of timing quantities. S3 may be performed substantially simultaneously with S2 or S1, or may be performed at a different time. Forming of the tiered timing quantity arrangement may be performed in a plurality of known manners. For example, the tiered timing quantity arrangement may be formed including at least two "tiers", or hierarchical divisions. At least one upper (more critical) tier in the arrangement may include one or more critical timing quantities, which are more critical than those in a lower tier. As will be described in greater detail below, the tiered timing quantity arrangement may include any arrangement that allows for ranking or ordering timing quantities according to criticality.

S4 includes removing the most critical timing quantity from the set of timing quantities and placing that most critical timing quantity in an uppermost available tier of the tiered timing quantity arrangement. For example, using the timing quantity distributions shown and described with reference to FIG. 1 and S2, S4 may include removing timing quantity distribution R from the set of timing quantities distributions [R, G, B]. Further, S4 may include placing timing quantity distribution R in the uppermost tier of the tiered timing quantity arrangement. In one embodiment, the tiered timing quantity arrangement may include one available position in its uppermost tier, placing timing quantity distribution R alone at the top of (or front of, or head of, etc.) the tiered timing quantity arrangement. In any case, timing quantity distribution R may be removed from the set of timing quantity distributions [R, G, B]. In another embodiment, all timing quantities above a pre-determined criticality threshold may be removed and placed in an uppermost available tier of the tiered timing quantity arrangement. For example, using the set of timing quantity distributions [R, G, B] shown and described with reference to FIG. 2, timing quantities with non-zero criticalities may be removed and placed in an uppermost available tier of the tiered timing tree.

S5 includes repeating the determining, forming and removing for the set of timing quantities excluding the removed most critical timing quantity. For example, after removing timing quantity distribution R from the set of timing quantity distributions [R, G, B], leaving the set including [G, B], S2-S4 may be repeated for only the remaining timing quantities [G, B]. Using the example of FIG. 1 above, after removing timing quantity R from the set of timing quantities, a criticality analysis may be used to determine a most critical timing quantity between timing quantities G and B. As discussed with reference to FIG. 1, G will have a greater probability than B of being most critical (e.g., of 0.7). However, it is worth noting that B will still have a small criticality (e.g., 0.3), both of which were "masked" by the dominance of timing quantity R using a strict criticality approach. After identifying that G is the most critical timing quantity in the set of [G, B], and repeating S4, timing quantity G may be removed and placed in an uppermost available tier of the tiered timing quantity arrangement. In the case that timing quantity R is alone at the first (or top, or head, etc.) position in the tiered timing quantity arrangement, timing quantity G may be placed at the next available (e.g., second tier) position in the arrangement. While S5 need not be repeated in the example shown and described with reference to FIG. 1, it is understood that embodiments include repeating S2-S5 (and in some embodiments, S1 as well) for a larger set of timing quantities (e.g., 4 or more). In any case, S1-S5 may allow for accurate ordering of correlated timing quantities.

Figure 4:
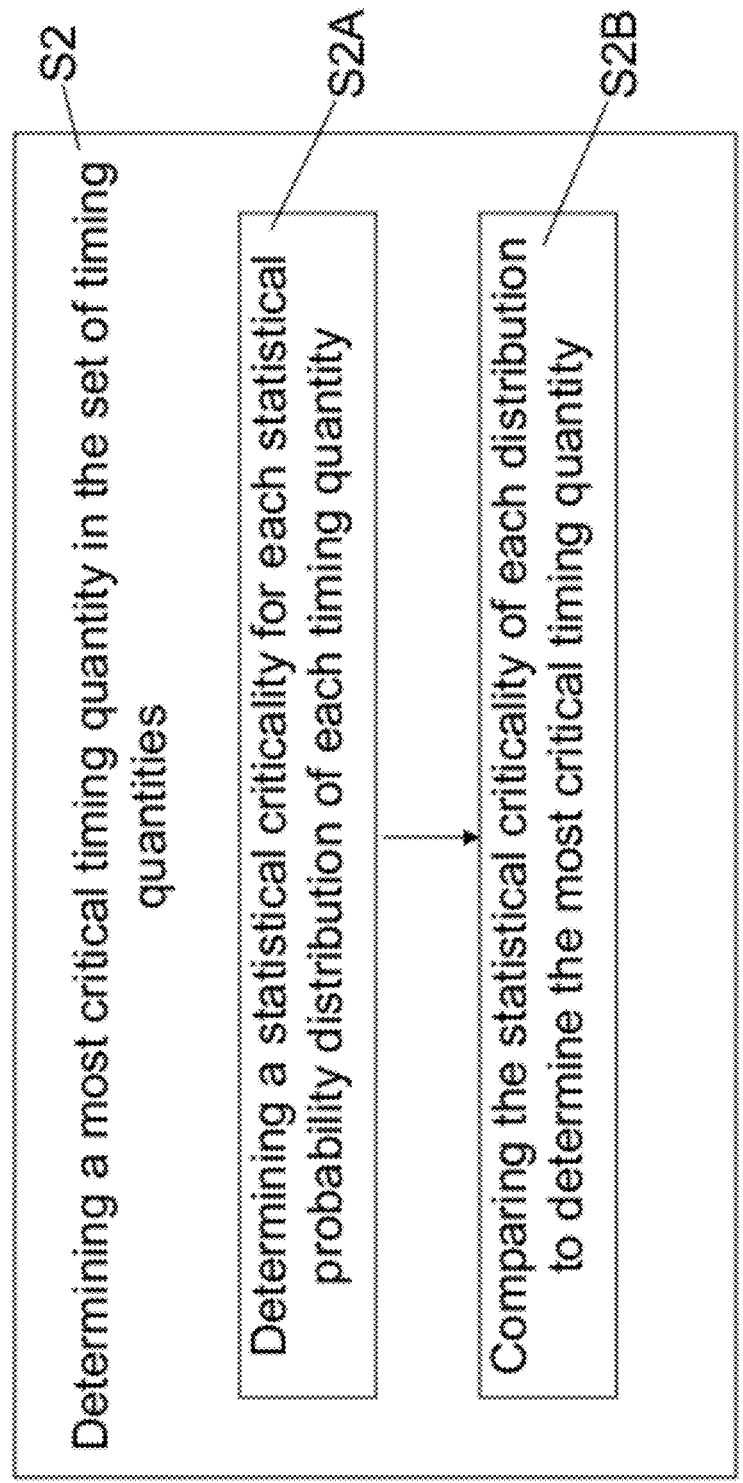
Figure 5:
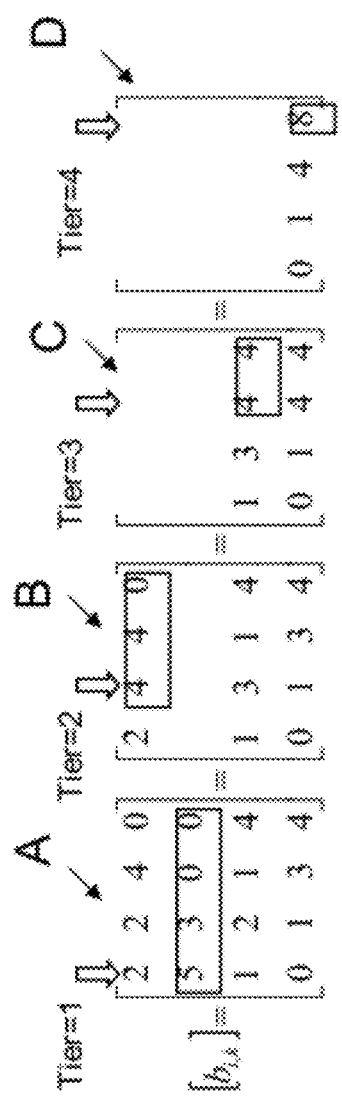
FIG. 5 shows an illustrative example of Monte-Carlo tables used according to embodiments.

Turning to FIG. 4, a method flow diagram illustrating sub-method steps included in one embodiment of S2 (FIG. 3) is shown. In this embodiment, the determining of a most critical timing quantity in the set of timing quantities may include two sub-processes. A first sub-process S2A may include determining a statistical criticality for each statistical probability distribution of each timing quantity. In one embodiment, this may include using a Monte Carlo (MC)-based method for evaluating timing quantity data. Turning to FIG. 5, an example of matrices created and analyzed using a Monte Carlo-based method is shown. The example shown in FIG. 5 illustrates an analysis of four deterministic timing quantity distributions (e.g., slacks) derived from testing an integrated circuit (or its design structure). The first matrix $[S_{i,j}]$ is a sorting matrix, which includes entries representing the four deterministic timing quantities, represented by 4 rows beginning: $S_{1,1}$, $S_{2,1}$, $S_{3,1}$ and $S_{4,1}$, respectively. In this example, eight (8) MC trials were run on the group of timing quantities, each trial represented by a distinct one of the eight columns in matrix $[S_{i,j}]$. For each trial (each column in matrix $[S_{i,j}]$), the four deterministic timing quantities are rank ordered, and that rank order is illustrated in the right-hand matrix $[S_{i,j}]$ (with rank ordering indicated by parenthetical numbering). Continuing with this example, matrix $[r_{i,j}]$ represents the condensed ranking of each timing quantity from matrix $[S_{i,j}]$, including the parenthetical ranking notations shown in the $[S_{i,j}]$ matrix shown above. Matrix $[b_{i,k}]$ represents a "bookmarked" version of matrix $[r_{i,j}]$, representing a number of times each timing quantity was ranked from first to fourth among the timing quantities. For example, looking at the first row of matrix $[r_{i,j}]$, which represents a single timing quantity distribution, it is evident that this timing quantity was ranked as follows: First, two times; second, two times; third, four times; and fourth, zero times. This results in the row in matrix $[b_{i,k}]$ reading: "2 2 4 0." This pattern follows for each row of matrices $[r_{i,j}]$ and $[b_{i,k}]$, respectively. The completed matrix $[b_{i,k}]$, therefore, represents statistical criticalities for each statistical probability distribution.

Returning to FIG. 4, S2B includes comparing the statistical criticality for each distribution to determine the most critical timing quantity. For example, returning to FIG. 5, matrix $[b_{i,k}]$ may be used to determine the most critical timing quantities in each distribution (e.g., by comparing rows in matrix $[b_{i,k}]$). In this case, the first quantity in each row of matrix $[b_{i,k}]$ may be compared to determine which row (distribution) has the highest probability of being most critical. In the example shown in FIG. 5, the second row of matrix $[b_{i,k}]$ includes the highest value, 5. This value represents the number of times the distribution ranked most critical (e.g., with a 1 value in matrix $[r_{i,j}]$, discussed above). Therefore, the distribution represented by the second row of matrix $[b_{i,k}]$ is most critical in this example (e.g., timing quantity R from FIG. 1), and may be placed in a first tier ("tier=1") in a tiered quantity arrangement (described above).

With continuing reference to FIG. 5, after determining the most critical distribution, that distribution may be removed from matrix (indicated by a rectangular box in Matrix A) and the most critical remaining (2nd tier) distribution may be determined. Using the second $[b_{i,k}]$ matrix from the left in FIG. 5 as an example (Matrix B), values in the second row of matrix B may be compared to determine which row (distribution) has the highest probability of being most critical. As a preliminary step, matrix B may be modified from matrix A by adding the remaining values (excluding the removed second row, boxed) from the first column to the values in the second column for the three remaining rows. As shown, this includes adding the values [2_1 0] to the remaining second column values in matrix A of [2_2 1]. Thus the resulting values for column 2 (tier=2) of matrix B are [4_3 1]. As described with reference to the determination of the most critical timing distribution (e.g., tier=1), determining the most critical remaining distribution involves comparing the values in the second column of matrix B to determine which value is largest. In this example, the distribution associated with row 1 is the most critical remaining distribution (tier=2). After determining the distribution associated with row 1 is the most critical, its values may be removed from Matrix B (indicated by a rectangular box), and those remaining values in column 2 [___3 1] may be added to the remaining values in column 3 [___1 3], the result of which is shown in Matrix C. This process may be repeated for each remaining distribution (e.g., tier=3 and tier=4).

Figure 6:
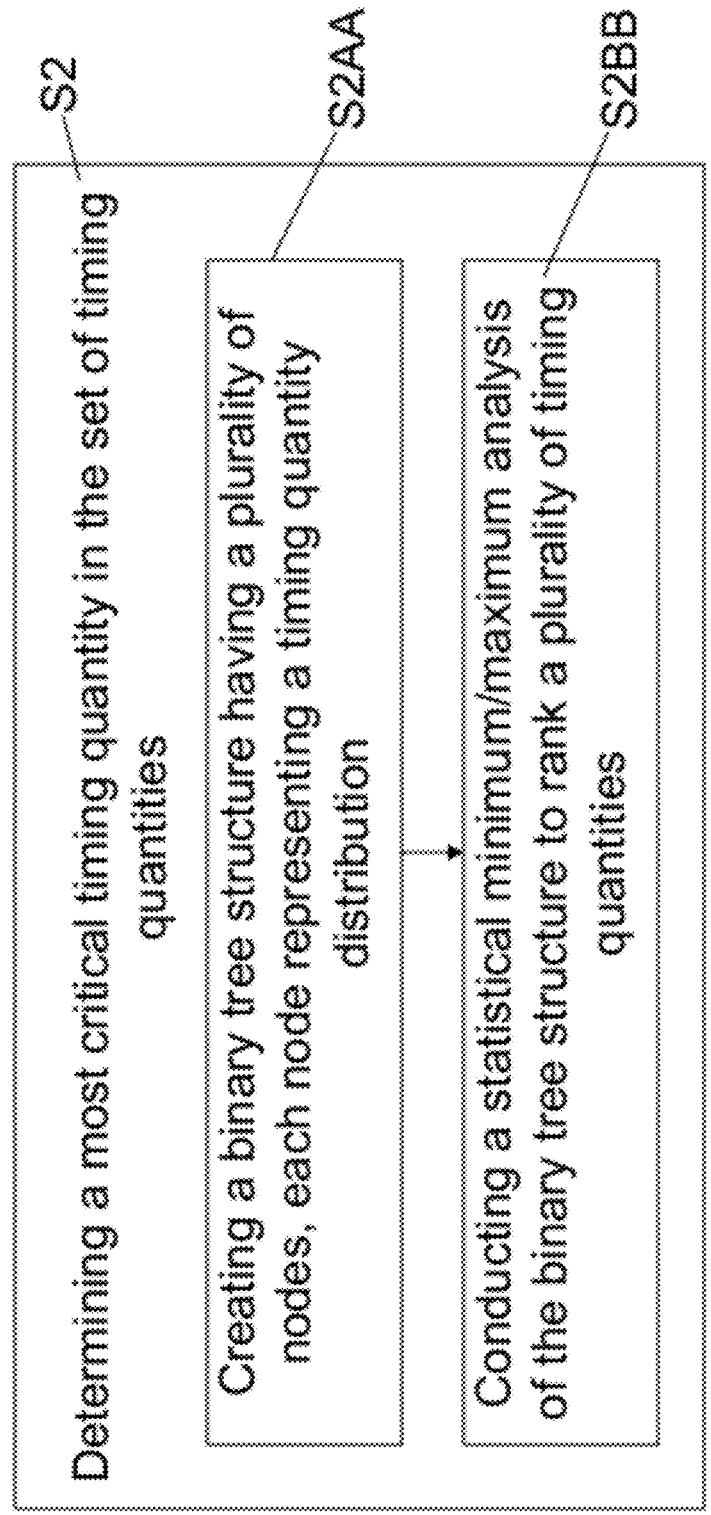
FIGS. 6-8 show flow charts illustrating a method according to embodiments.
Figure 7:
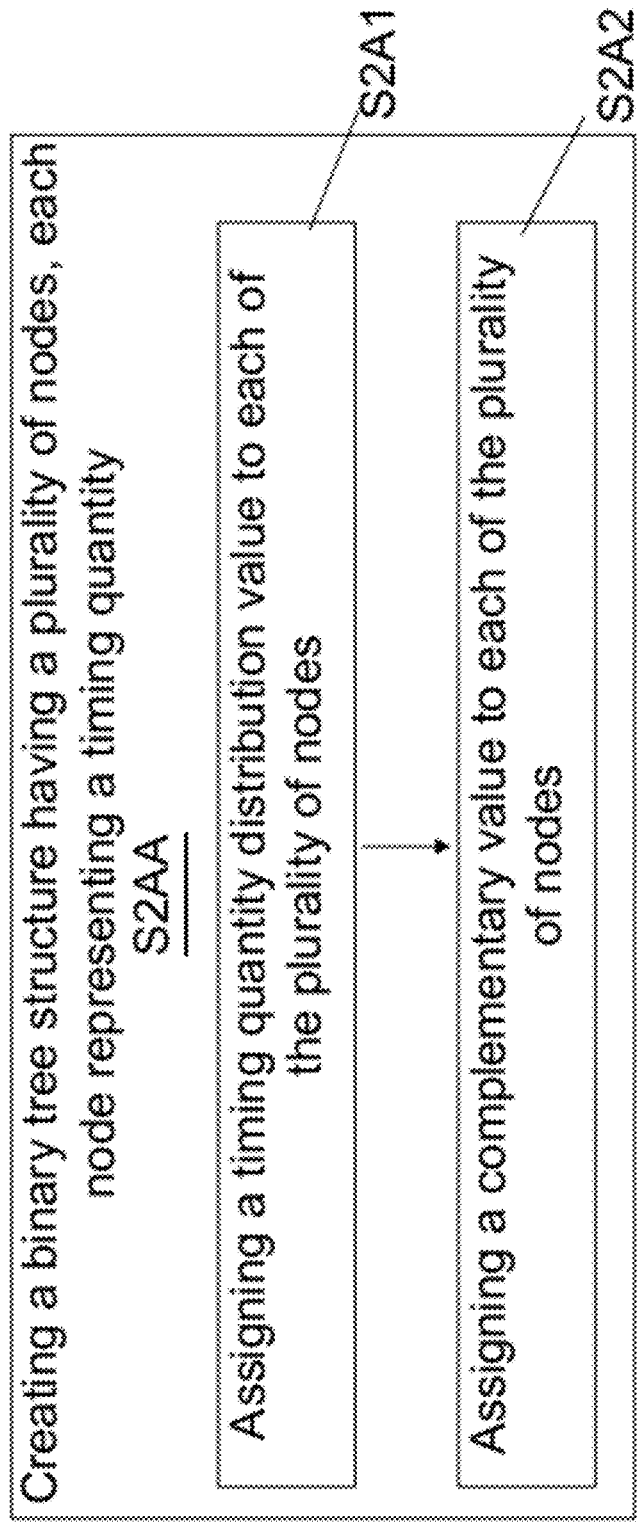

Turning to FIGS. 6-7, another embodiment of ranking a plurality of timing quantities (and determining a most critical timing quantity) in the set of timing quantities is illustrated in S2AA and S2BB. In these steps, the ranking (and determining) may include creating a binary tree structure having a plurality of nodes, where each leaf node in the tree structure represents a timing quantity distribution (S2AA). The binary tree structure may be created from the bottom up, starting with the leaf nodes. Initially, this bottom-up technique may involve assigning a timing quantity distribution to each leaf node, where the assigning may be arbitrary. Each leaf node may have a parent node (at a "Tier 2"), and in the case that an even number of leaf nodes exist, each leaf node may share a parent node with another leaf node. Tiers (e.g., Tier 3, Tier 4, etc.) of parent nodes may be added above the Tier 2 level of parent nodes until a single parent ("root") node is determined. After constructing the binary tree, values representing timing quantity distributions may be assigned to each of the nodes in the tree (FIG. 7, S2A1). As described above, the leaf nodes may be assigned values representing timing quantity distributions to be ranked. Going from the leaf nodes upward, timing quantity distributions of leaf nodes are compared, and the minimum (more critical) distribution is assigned to the parent node (at Tier 2) of those leaf nodes. This process may be repeated for all of the leaf nodes in the tree, and may be repeated for all of the parent nodes at upper tiers (e.g., Tier 3, Tier 4, etc.), until all of the nodes in the tree are assigned values representing timing quantity distributions. It is understood that the term "leaf node" is used herein to refer to those nodes representing the timing quantity distributions to be ranked. The terms "parent node" and "child node" are relative terms relating to either the leaf nodes or other upper tier (Tier 2 or higher) nodes. That is, for example, one node's parent may be another node's child. Where the terms "parent node" and/or "child node" are used herein, it is merely for illustrative purposes to describe a relative relationship between nodes in the tree.

After all nodes of the tree are assigned a first set of values, a second set of complementary values may be assigned to those nodes (FIG. 7, S2A2). Each complementary value at a node may represent timing quantity distribution values for those leaf nodes that are not its descendants. These complementary values may be assigned in a top-down (root-to-leaf) traversal of the tree structure. For example, starting from the root (which is assigned an infinity value) and traversing down to the first level of parents, a first parent node will be assigned a complementary value representing timing quantity distribution values for all those leaf nodes that are not its descendants. For example, if two parent nodes are in this level of the tree (node X and node Y), then node X will have a complementary value equal to node Y (which is equal to the minimum timing quantity distribution value for the leaf nodes at the base of node Y's branch of the tree). In this example, node Y will have a complementary value equal to node X. Assigning of these complementary values may be performed across all tiers of the tree, and may ultimately result in each node being assigned two distinct values representing timing quantity distributions.

Figure 8:
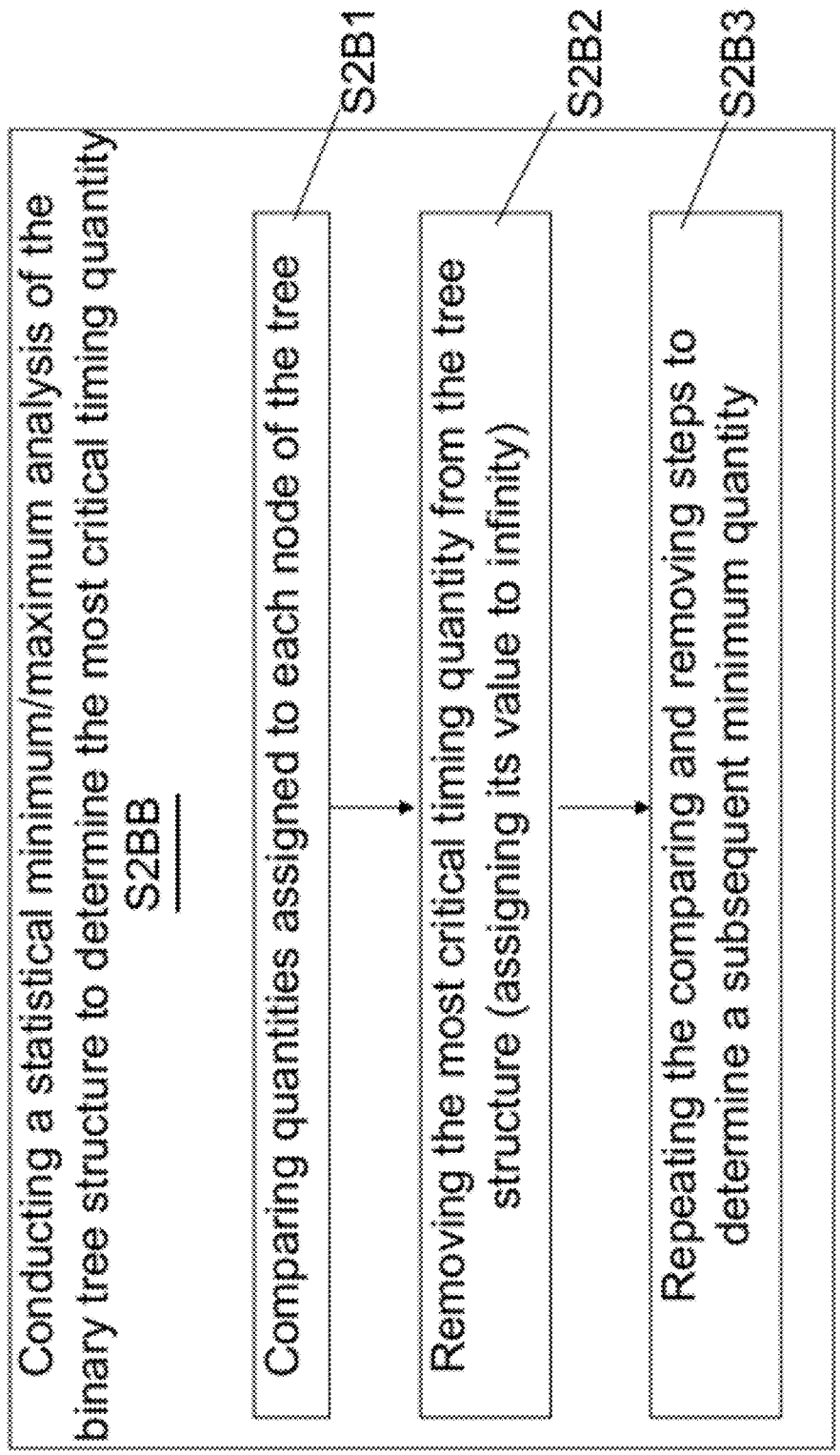

Following construction of the binary tree structure, a statistical minimum/maximum analysis ("traversing the tree", FIG. 6, S2BB) may be performed on the binary tree structure to rank a plurality of timing quantities (and determine the most critical timing quantity). This statistical minimum/maximum analysis is illustrated in the flow chart of FIG. 8. This statistical minimum/maximum analysis may involve: in S2B1, finding a most critical timing quantity (by comparing quantities assigned to each node of the tree); in S2B2, removing that most critical timing quantity from the tree structure (assigning its value to infinity); and in S2B3, repeating the finding and removing for remaining quantities (nodes) to determine a next most critical timing quantity.

Figure 9:
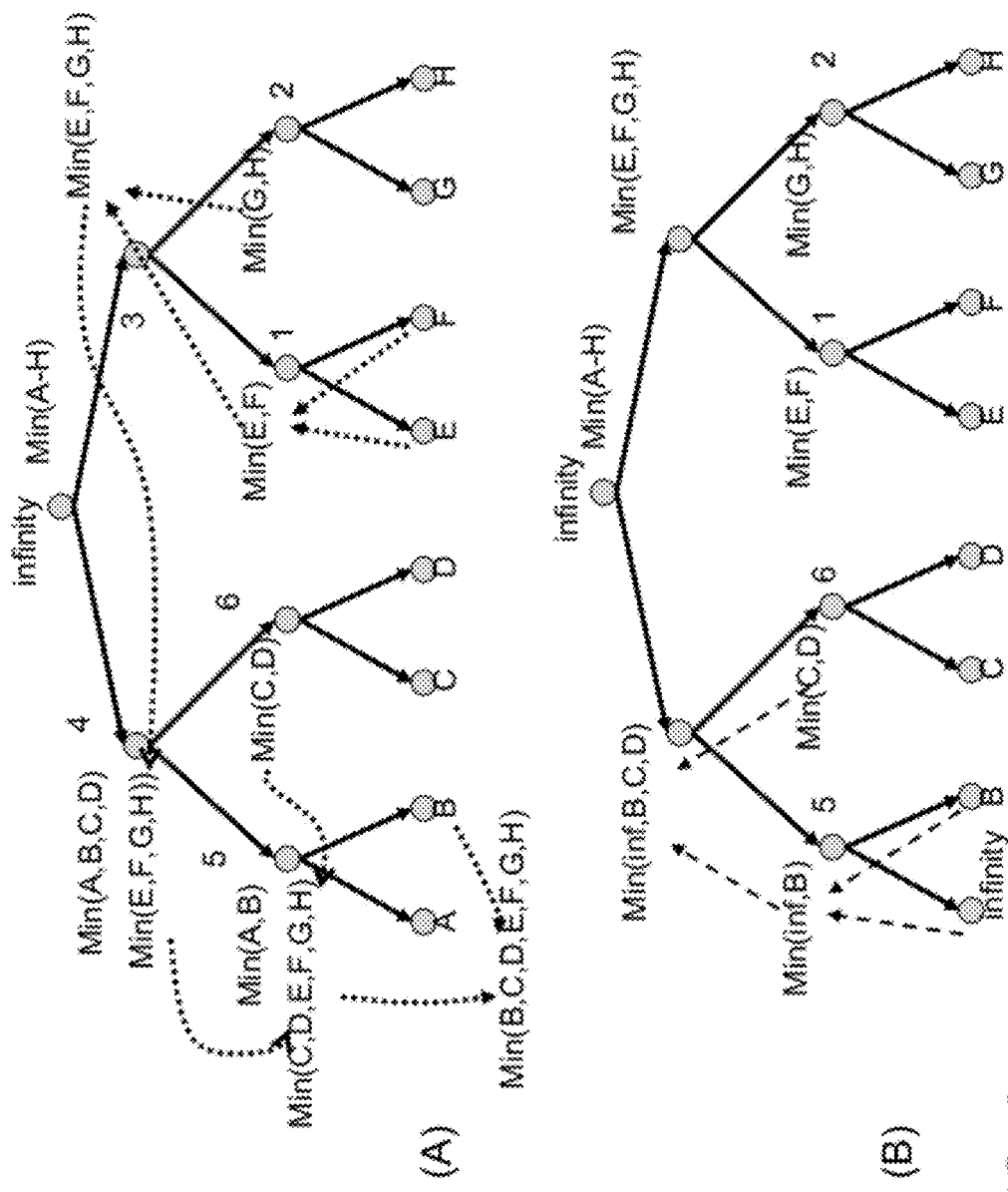
FIG. 9 shows an illustrate example of a binary tree structure used according to embodiments.

Turning to FIG. 9A, an example of a binary tree structure is shown including a plurality of nodes. In this example, which is merely an arbitrary construction, the binary tree may have a root node, two parent nodes below the root node, where each parent node further has two child nodes, and each child node has two leaf nodes. It is understood that this example of a binary tree structure only includes eight timing quantity distributions (A-H), and that greater or fewer numbers of timing quantity distributions may be evaluated using larger or smaller tree structures. In this example, describing one half of the tree (with leaf nodes E-H), the binary tree structure includes a parent node, two child nodes stemming from the parent node, and four leaf nodes (two stemming from each parent). This portion of the tree may be constructed and analyzed according to the method steps described with reference to FIGS. 6-8 (and illustrated by arrows in FIG. 9A). For example, in step S2A1 (FIG. 7), this portion of the tree may be constructed by first taking quantities associated with nodes E and F, respectively, and determining which quantity is smaller. That smaller quantity is the (Min(E,F)), and is assigned to the parent node (node 1) of leaf nodes E and F. Simultaneously, or at a different time, leaf node G and leaf node H may be compared to determine a Min(G,H), which may be assigned to their parent node (node 2). After assigning a value to node 1 (Min(E,F)) and a value to node 2 (Min(G, H)), these values may be compared to determine a Min(E,F, G,H), which may be assigned to the parent node (node 3) of nodes 1 and 2. A similar comparison may be performed on the left side of the binary tree structure, whereby a Min(A,B), Min(C,D), and Min(A,B,C,D) may be assigned to nodes in a similar manner as described with reference to nodes 1, 2, and 3. Additionally, Min(A,B,C,D) may be compared with Min (E,F,G,H) to determine a Min(A-H), which represents the minimum timing quantity for the entire tree structure (the quantity being assigned to the root node). This bottom-up traversal of the tree may populate half of the values ultimately assigned to each node.

Returning to FIG. 7 (with reference to the example of FIGS. 9A-9B), in step S2A2, a complementary value may be assigned to each of the nodes in the tree through a top-down traversal. This top-down traversal is illustrated by the arrows on the left portion of FIG. 9A. For example, the root node is assigned a complementary value as infinity. Node 4 may be assigned a complementary value associated with the Min(E, F,G,H), which represents the minimum value of the timing quantities assigned to the right-hand side of the binary tree. Further, descendent nodes of node 4 (e.g., node 5) may be assigned complementary values associated with minimum values of their sibling node(s), as well as those nodes in distinct portions of the tree. For example, node 5 may be assigned a complementary value associated with Min(C,D,E, F,G,H). These complementary values may be assigned throughout the tree through this top-down traversal, and may be assigned across all branches of the tree. For example, the complementary value associated with node 2 may be Min(E, F,A,B,C,D). In any case, the complementary values may be assigned to each of the nodes through a top-down traversal, providing distinct complement timing quantities associated with each of the nodes of the tree.

Turning back to FIG. 8, following construction of the binary tree structure (including assigning of values to nodes), a statistical minimum/maximum analysis of the tree may be performed to rank a plurality of timing quantities (step S2BB). This statistical minimum/maximum analysis may determine which of the plurality of timing quantities associated with the plurality of nodes is most critical. This statistical minimum/maximum analysis may include, for example, a comparative analysis. Using the example of FIG. 9B, node A is determined (e.g., through comparing minimum values) to be associated with the most critical timing distribution. After determining that node A is the most critical timing quantity distribution (minimum value), that timing quantity associated with node A may be removed from the binary tree structure and placed in a tiered arrangement (as described with respect to FIG. 3 above). Node A may then be assigned a value of infinity, and the comparing of values may be repeated to determine the next smallest timing quantity distribution. The next smallest quantity may be removed from its associated node and placed in the next highest available tier of the tiered structure, and that node may be assigned a value of infinity. This process may be repeated until all desired timing quantity distributions have been ranked. It is understood that assigning a value of infinity to nodes determined to represent minimum values is only one approach for eliminating those nodes from affecting future analysis. Because a value of infinity will never be smaller than a value of a timing quantity distribution, when comparing timing quantity distribution values with a node assigned an infinity value, that timing quantity distribution will always be the minimum value.

Assigning an infinity value to the node associated with a smallest quantity allows for a reduction in computational steps using the binary tree structure. For example, in the previous example (assigning a value of infinity to leaf node A) describe with reference to FIG. 9B, while portions of the minimum values on the left side of the tree may require recalculation, minimum values on the right side of the tree need not be recalculated.

Figure 10:
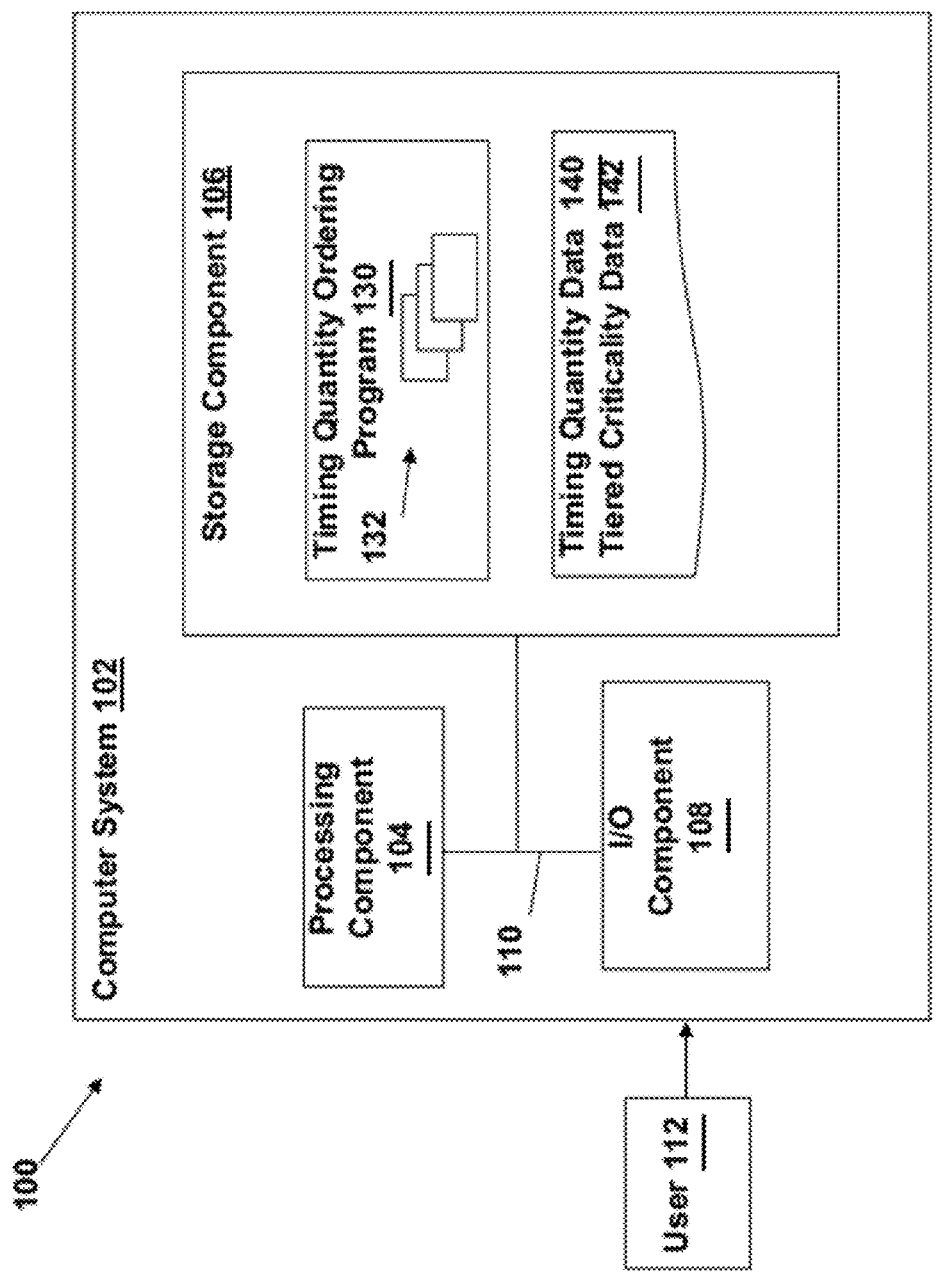
FIG. 10 shows an illustrative environment according to an embodiment.

FIG. 10 depicts an illustrative environment 100 for ordering of statistical correlated quantities according to an embodiment. To this extent, the environment 100 includes a computer system 102 that can perform a process described herein in order to order statistical correlated quantities. In particular, the computer system 102 is shown as including an timing quantity ordering program 130, which makes computer system 102 operable to order statistical correlated quantities by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the timing quantity ordering program 130, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 112 to interact with the computer system 102 and/or one or more communications devices to enable a system user 112 to communicate with the computer system 102 using any type of communications link. To this extent, the timing quantity ordering program 130 can manage a set of interfaces (e.g., graphical user interface(s), application program interface, etc.) that enable human and/or system users 112 to interact with the timing quantity ordering program 130. Further, the context program 130 can manage (e.g., store, retrieve, create, manipulate, organize, present, etc.) data, such as timing quantities 140, tiered criticality 142, etc., using any solution.

In any event, the computer system 102 can comprise one or more general purpose computing articles of manufacture (e.g., computing devices) capable of executing program code, such as the timing quantity ordering program 130, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the timing quantity ordering program 130 can be embodied as any combination of system software and/or application software.

Further, the timing quantity ordering program 130 can be implemented using a set of modules 132. In this case, a module 132 can enable the computer system 102 to perform a set of tasks used by the timing quantity ordering program 130, and can be separately developed and/or implemented apart from other portions of the timing quantity ordering program 130. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of timing quantity ordering program 130 fixed thereon (e.g., one or more modules 132). However, it is understood that the computer system 102 and timing quantity ordering program 130 are only representative of various possible equivalent computer systems that may perform a process described herein. To this extent, in other embodiments, the functionality provided by the computer system 102 and timing quantity ordering program 130 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as timing quantity data 140 and tiered criticality data 142 using any solution. For example, the computer system 102 can generate and/or be used to generate timing quantity data 140 and tiered criticality data 142, retrieve timing quantity data 140 and tiered criticality data 142, from one or more data stores, receive timing quantity data 140 and tiered criticality data 142, from another system, send timing quantity data 140 and tiered criticality data 142 to another system, etc.

While shown and described herein as a method and system for ordering statistical correlated timing quantities, it is understood that aspects of the invention further provide various alternative embodiments. For example, in one embodiment, the invention provides a computer program fixed in at least one computer-readable medium, which when executed, enables a computer system to group windows based on user-defined contexts. To this extent, the computer-readable medium includes program code, such as the timing quantity ordering program 130 (FIG. 10), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the timing quantity ordering program 130 (FIG. 10), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for grouping windows based on user-defined contexts. In this case, a computer system, such as the computer system 102 (FIG. 10), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

It is understood that aspects of the invention can be implemented as part of a business method that performs a process described herein on a subscription, advertising, and/or fee basis. That is, a service provider could offer to group windows based on user-defined contexts as described herein. In this case, the service provider can manage (e.g., create, maintain, support, etc.) a computer system, such as the computer system 102 (FIG. 10), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of determining an order of statistical correlated quantities in an integrated circuit, performed using at least one computing device, the method comprising:
   timing a plurality of paths in an integrated circuit to determine a set of timing quantities associated with each of the plurality of paths,
   wherein each timing quantity in the set of timing quantities includes a statistical probability distribution;
   determining a most critical timing quantity in the set of timing quantities, using the at least one computing device;
   forming a tiered timing quantity arrangement for ordering a plurality of timing quantities in the set of timing quantities, using the at least one computing device;
   removing the most critical timing quantity from the set of timing quantities and placing the most critical timing quantity in an uppermost available tier of the tiered timing quantity arrangement; and
   repeating the determining, forming and removing for the set of timing quantities excluding the removed most critical timing quantity.

2. The method of claim 1, wherein the determining of the most critical timing quantity includes determining a statistical criticality quantity in each statistical probability distribution and comparing the critical timing quantity in each distribution to determine the most critical timing quantity.

3. The method of claim 1, wherein the determining of the most critical timing quantity is performed using a Monte Carlo analysis of N timing quantities and M Monte Carlo Trials.

4. The method of claim 1, wherein the determining of the most critical timing quantity includes:
   creating a binary tree structure having a plurality of nodes, the creating including:
   assigning a timing quantity distribution value to each of the plurality of nodes;
   assigning a complementary value to each of the plurality of nodes, the complementary value representing timing quantity distribution values for a plurality of leaf nodes that are not descendents of the assigned node in the plurality of nodes; and conducting a statistical minimum/maximum analysis of the binary tree structure to rank a plurality of the timing quantity distribution values.

5. The method of claim 4, wherein the conducting of the statistical minimum/maximum analysis includes:

comparing quantities assigned to each of the plurality of nodes;

removing the most critical timing quantity from a node in the binary tree structure;

assigning a value of infinity to the node representing the removed quantity; and repeating the comparing, removing and assigning for a subsequent most critical timing quantity.

6. A computer system comprising:

a set of computing devices configured to determine an order of statistical correlated quantities in an integrated circuit, by performing actions comprising:

receiving timing quantity data derived from testing of an integrated circuit, the timing quantity data including a set of timing quantities associated with a plurality of paths in the integrated circuit;

determining a most critical timing quantity in the set of timing quantities, wherein the determining of the most critical timing quantity is performed using a Monte Carlo analysis of N timing quantities and M Monte Carlo Trials;

forming a tiered timing quantity arrangement for ordering a plurality of timing quantities in the set of timing quantities;

removing the most critical timing quantity from the set of timing quantities and placing the most critical timing quantity in an uppermost available tier of the tiered timing quantity arrangement; and repeating the determining, forming and removing for the set of timing quantities excluding the removed most critical timing quantity.

7. A program product stored on a non-transitory computer readable medium for determining an order of statistical correlated quantities in an integrated circuit, which when executed on at least one computing device, performs the following:

receives timing quantity data derived from testing of an integrated circuit, the timing quantity data including a set of timing quantities associated with a plurality of paths in the integrated circuit;

determines a most critical timing quantity in the set of timing quantities;

forms a tiered timing quantity arrangement for ordering a plurality of timing quantities in the set of timing quantities;

removes the most critical timing quantity from the set of timing quantities and placing the most critical timing quantity in an uppermost available tier of the tiered timing quantity arrangement;

repeats the receiving, determining, forming and removing for the set of timing quantities excluding the removed most critical timing quantity; and modifies a design of the integrated circuit to reduce a criticality of the most critical timing quantity.

8. The program product of claim 7, wherein the determining of the most critical timing quantity is performed using a Monte Carlo analysis of N timing quantities and M Monte Carlo Trials.

9. The program product of claim 7, wherein the determining of the most critical timing quantity includes:

creating a binary tree structure having a plurality of nodes, the creating including:

assigning timing quantity distribution values to each of the plurality of nodes;

assigning a complementary value to each of the plurality of nodes, the complementary value representing timing quantity distribution values for a plurality of leaf nodes that are not descendents of the assigned node in the plurality of nodes; and conducting a statistical minimum/maximum analysis of the binary tree structure to rank a plurality of the timing quantity distribution values.

10. The program product of claim 9, wherein the conducting of the statistical minimum/maximum analysis includes:

comparing quantities assigned to each of the plurality of nodes;

removing the most critical timing quantity from a node in the binary tree structure;

assigning a value of infinity to the node representing the removed quantity; and repeating the comparing, removing and assigning for a subsequent most critical timing quantity.

* * * * *